United States Patent
Li et al.

(10) Patent No.: US 10,630,488 B2
(45) Date of Patent: Apr. 21, 2020

(54) METHOD AND APPARATUS FOR MANAGING APPLICATION IDENTIFIER

(71) Applicant: Huawei Technologies Co., Ltd., Shenzhen (CN)

(72) Inventors: Yingtao Li, Shenzhen (CN); He Wei, Shenzhen (CN); Jinbo Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 301 days.

(21) Appl. No.: 15/498,310

(22) Filed: Apr. 26, 2017

(65) Prior Publication Data
US 2017/0230187 A1    Aug. 10, 2017

Related U.S. Application Data

(63) Continuation of application No. PCT/CN2015/091766, filed on Oct. 12, 2015.

(30) Foreign Application Priority Data

Mar. 31, 2015   (CN) .......................... 2015 1 0147302

(51) Int. Cl.
*H04L 9/32* (2006.01)
*H04L 9/06* (2006.01)
(Continued)

(52) U.S. Cl.
CPC .......... *H04L 9/3268* (2013.01); *H04L 9/0643* (2013.01); *H04L 9/14* (2013.01);
(Continued)

(58) Field of Classification Search
CPC ... H04L 9/3268; H04L 9/3247; H04L 9/0643; H04L 9/30; H04L 9/14; H04L 9/3231; H04L 2209/80
(Continued)

(56) References Cited

U.S. PATENT DOCUMENTS 6,826,690 B1 *  11/2004  Hind ....................... G06F 21/31
                                              713/173
7,574,734 B2 *   8/2009  Fedronic ................. G06F 21/32
                                              382/115
(Continued)

FOREIGN PATENT DOCUMENTS

CN          101119198 A       2/2008
CN          101426201 A       5/2009
(Continued)

*Primary Examiner* — David J Pearson
*Assistant Examiner* — Badri Narayanan Champakesan
(74) *Attorney, Agent, or Firm* — Slater Matsil, LLP

(57) ABSTRACT

Embodiments provide a method and an apparatus for managing an application identifier. The method includes: receiving, by an identifier management apparatus, an application identifier certificate application request sent by a user, and acquiring a user identifier and an application identifier of the user according to the application identifier certificate application request. The method also includes acquiring a feature identifier of the user according to the user identifier, generating an application identifier certificate according to the application identifier and the feature identifier of the user, and sending the application identifier certificate to the user.

18 Claims, 6 Drawing Sheets

(51) Int. Cl.
  *H04L 9/14* (2006.01)
  *H04L 9/30* (2006.01)
(52) U.S. Cl.
  CPC .............. *H04L 9/30* (2013.01); *H04L 9/3231* (2013.01); *H04L 9/3247* (2013.01); *H04L 2209/80* (2013.01)
(58) Field of Classification Search
  USPC ....................................................... 713/156
  See application file for complete search history.

(56) References Cited

U.S. PATENT DOCUMENTS

| | | | | |
|---|---|---|---|---|
| 8,006,288 | B2* | 8/2011 | Camenisch | G06F 21/33 455/403 |
| 8,904,498 | B2* | 12/2014 | Tootill | G06F 21/32 726/5 |
| 8,965,066 | B1* | 2/2015 | Derakhshani | H04L 9/14 382/117 |
| 9,313,203 | B2* | 4/2016 | Adler | G06F 21/62 |
| 2002/0026575 | A1* | 2/2002 | Wheeler | G06Q 20/00 713/156 |
| 2006/0048212 | A1* | 3/2006 | Tsuruoka | H04L 9/0866 726/4 |
| 2007/0283164 | A1* | 12/2007 | Nishizawa | H04L 63/0861 713/186 |
| 2008/0065895 | A1* | 3/2008 | Liu | H04L 63/0861 713/176 |
| 2011/0264919 | A1* | 10/2011 | Pizano | H04L 9/0866 713/186 |
| 2012/0226908 | A1* | 9/2012 | Mokrushin | H04L 9/3271 713/168 |
| 2013/0132091 | A1* | 5/2013 | Skerpac | G10L 17/005 704/273 |
| 2013/0139235 | A1* | 5/2013 | Counterman | H04L 63/061 726/7 |
| 2013/0246281 | A1* | 9/2013 | Yamada | G06F 21/31 705/71 |
| 2013/0263238 | A1* | 10/2013 | Bidare | G07C 9/00087 726/7 |
| 2014/0136419 | A1* | 5/2014 | Kiyohara | G06Q 20/3221 705/67 |
| 2015/0350879 | A1* | 12/2015 | Li | H04W 8/183 455/558 |
| 2016/0360403 | A1* | 12/2016 | Jordi | H04L 63/0823 |
| 2017/0250807 | A1* | 8/2017 | Brannon | H04L 9/0822 |

FOREIGN PATENT DOCUMENTS

| | | |
|---|---|---|
| CN | 102006299 A | 4/2011 |
| CN | 102769606 A | 11/2012 |
| KR | 20030045419 A | 6/2003 |

* cited by examiner

METHOD AND APPARATUS FOR MANAGING APPLICATION IDENTIFIER

CROSS-REFERENCE TO RELATED APPLICATIONS

This application is a continuation of International Application No. PCT/CN2015/091766, filed on Oct. 12, 2015, which claims priority to Chinese Patent Application No. 201510147302.6, filed on Mar. 31, 2015. The disclosures of the aforementioned applications are hereby incorporated by reference in their entireties.

TECHNICAL FIELD

The present invention relates to the Internet field, and specifically, to a method and an apparatus for managing an application identifier.

BACKGROUND

After over two decades of rapid development, the Internet has currently penetrated into every aspect of people's daily life, and it is difficult for people to live without the Internet.

In daily life, people can work, entertain themselves, and communicate by using the Internet. For example, people register an Email account or a social account on the Internet to communicate, people register a shopping platform account or a network banking account on the Internet to shop, and people register a gaming platform account on the Internet to entertain themselves. In addition, with the rapid rise of the mobile Internet, wearable devices, and the Internet of Things, a quantity of electronic devices that are associated with or possessed by a user also increases rapidly, and the user also needs to identify and manage these devices by verifying validity of their identifiers.

It can be learned from the foregoing that people have a large quantity of accounts on the Internet, and existence of the accounts is to prove people's identity. In this case, people may submit much private information in a process of registering the large quantity of the accounts, the private information may be acquired by a hacker, and disclosure of the private information may cause a property loss of a user. Therefore, it is essential to reduce disclosure of the private information of the user while proving an identity of the user.

SUMMARY

Embodiments of the present invention provide a method and an apparatus for managing an application identifier, which can reduce disclosure of private information of a user while proving an identity of the user.

A first aspect of the embodiments of the present invention discloses a method for managing an application identifier. The method includes: receiving, by an identifier management apparatus, an application identifier certificate application request sent by a user; acquiring, by the identifier management apparatus, a user identifier and an application identifier of the user according to the application identifier certificate application request. The method also includes acquiring, by the identifier management apparatus, a feature identifier of the user according to the user identifier; generating, by the identifier management apparatus, an application identifier certificate according to the application identifier and the feature identifier of the user. The method also includes sending, by the identifier management apparatus, the application identifier certificate to the user.

With reference to the first aspect, in a first possible implementation manner of the first aspect, the generating, by the identifier management apparatus, an application identifier certificate according to the application identifier and the feature identifier of the user includes: combining, by the identifier management apparatus, a first randomization factor with the feature identifier of the user to obtain a first string; performing, by the identifier management apparatus, hashing on the first string according to a preset hash function to obtain a first hash value; obtaining, by the identifier management apparatus, a second string according to the application identifier and the first hash value; performing, by the identifier management apparatus by using a private key, digital signing on the second string to obtain a third string; and assembling, by the identifier management apparatus, the application identifier and the third string into the application identifier certificate according to a preset sequence.

With reference to the first aspect, in a second possible implementation manner of the first aspect, the application identifier certificate application request further includes a type of the application identifier; and the generating, by the identifier management apparatus, an application identifier certificate according to the application identifier and the feature identifier of the user specifically includes: generating, by the identifier management apparatus, the application identifier certificate according to the application identifier, the type of the application identifier, and the feature identifier of the user.

With reference to the second possible implementation manner of the first aspect, in a third possible implementation manner of the first aspect, the generating, by the identifier management apparatus, the application identifier certificate according to the application identifier, the type of the application identifier, and the feature identifier of the user specifically includes: combining, by the identifier management apparatus, a second randomization factor with the feature identifier of the user to obtain a fourth string; performing, by the identifier management apparatus, hashing on the fourth string according to a preset hash function to obtain a second hash value; obtaining, by the identifier management apparatus, a fifth string according to the type of the application identifier, the application identifier, and the second hash value; performing, by the identifier management apparatus by using a private key, digital signing on the fifth string to obtain a sixth string; and assembling, by the identifier management apparatus, the type of the application identifier, the application identifier, and the sixth string into the application identifier certificate according to a preset sequence.

With reference to the first aspect or any one of the first to the third possible implementation manners of the first aspect, in a fourth possible implementation manner of the first aspect, the application identifier certificate application request further includes a digital signature of the user; and before the generating, by the identifier management apparatus, an application identifier certificate according to the application identifier and the feature identifier of the user, the method further includes: acquiring, by the identifier management apparatus, a public key of the user according to the user identifier; verifying, by the identifier management apparatus, the digital signature of the user according to the public key of the user; and generating, by the identifier management apparatus, the application identifier certificate according to the application identifier and the feature identifier of the user when the digital signature of the user is successfully verified.

With reference to the fourth possible implementation manner of the first aspect, in a fifth possible implementation manner of the first aspect, before the sending, by the identifier management apparatus, the application identifier certificate to the user, the method further includes: encrypting, by the identifier management apparatus, the application identifier certificate according to the public key of the user; and the sending, by the identifier management apparatus, the application identifier to the user specifically includes: sending, by the identifier management apparatus, the encrypted application identifier to the user.

With reference to the first aspect or any one of the first to the fifth possible implementation manners of the first aspect, in a sixth possible implementation manner of the first aspect, before the acquiring, by the identifier management apparatus, a feature identifier of the user according to the user identifier, the method further includes: receiving, by the identifier management apparatus, the user identifier sent by the user and a biometric feature; generating, by the identifier management apparatus, the feature identifier of the user according to a first preset algorithm and the biometric feature; and saving, by the identifier management apparatus, a correspondence between the user identifier and the feature identifier of the user; and the acquiring, by the identifier management apparatus, a feature identifier of the user according to the user identifier specifically includes: acquiring, by the identifier management apparatus according to the correspondence, the feature identifier of the user corresponding to the user identifier.

With reference to the first aspect or any one of the first to the fifth possible implementation manners of the first aspect, in a seventh possible implementation manner of the first aspect, the acquiring, by the identifier management apparatus, a feature identifier of the user according to the user identifier specifically includes: acquiring, by the identifier management apparatus, a biometric feature of the user from the user identifier; and generating, by the identifier management apparatus, the feature identifier of the user according to a second preset algorithm and the biometric feature of the user.

A second aspect of the embodiments of the present invention discloses a method for managing an application identifier. The method includes receiving, by a terminal, an application identifier certificate sent by an identifier management apparatus, where the application identifier certificate is in an encrypted state. The method includes decrypting, by the terminal, the application identifier certificate according to a private key of a user to acquire a first string and a digital signature of the first string from the application identifier certificate, where the first string is generated according to an application identifier and a feature identifier, and the digital signature is created by the identifier management apparatus according to the first string and a private key of the identifier management apparatus. The method also includes decrypting, by the terminal, the digital signature according to a public key of the identifier management apparatus to obtain a second string. The method also includes verifying, by the terminal, validity of the application identifier certificate according to the first string and the second string.

With reference to the second aspect, in a first possible implementation manner of the second aspect, after the verifying, by the terminal, validity of the application identifier certificate according to the first string and the second string, the method further includes: if the application identifier certificate is valid, determining, by the terminal, a target server according to an application requirement of the user; and sending, by the terminal, a registration request to the target server, where the registration request includes a user identifier, the application identifier certificate, and a digital signature of the application identifier certificate, so that the target server verifies the validity of the application identifier certificate and completes registration, where the digital signature of the application identifier certificate is created by the terminal according to the application identifier certificate and the private key of the user.

With reference to the second aspect or the first possible implementation manner of the second aspect, in a second possible implementation manner of the second aspect, after the verifying, by the terminal, validity of the application identifier certificate according to the first string and the second string, the method further includes: if the application identifier certificate is valid, sending, by the terminal, a communication request to another terminal, where the communication request includes the application identifier certificate and the digital signature of the application identifier certificate, so that the another terminal verifies the validity of the application identifier certificate, where the digital signature of the application identifier certificate is created by the terminal according to the application identifier certificate and the private key of the user.

With reference to the first possible implementation manner of the second aspect or the second possible implementation manner of the second aspect, in a third possible implementation manner of the second aspect, the digital signature includes one or more of a type of the application identifier, a timestamp, or a randomizer.

A third aspect of the embodiments of the present invention discloses an identifier management apparatus. The apparatus includes: a receiving unit, configured to receive an application identifier certificate application request sent by a user. The apparatus also includes an acquiring unit, configured to acquire a user identifier and an application identifier of the user according to the application identifier certificate application request, where the acquiring unit is further configured to acquire a feature identifier of the user according to the user identifier. The apparatus also includes a generating unit, configured to generate an application identifier certificate according to the application identifier and the feature identifier of the user. The apparatus also includes a sending unit, configured to send the application identifier certificate to the user.

With reference to the third aspect, in a first possible implementation manner of the third aspect.

The generating unit includes a first combination subunit, a first hash subunit, a first joining subunit, and a first signing subunit, where the first combination subunit is configured to combine a first randomization factor with the feature identifier of the user to obtain a first string; the first hash subunit is configured to perform hashing on the first string according to a preset hash function to obtain a first hash value; the first joining subunit is configured to obtain a second string according to the application identifier and the first hash value; the first signing subunit is configured to perform, by using a private key, digital signing on the second string to obtain a third string; and the first combination subunit is further configured to assemble the application identifier and the third string into the application identifier certificate according to a preset sequence.

With reference to the third aspect, in a second possible implementation manner of the third aspect, the application identifier certificate application request further includes a type of the application identifier; and the generating unit is further configured to generate the application identifier certificate according to the application identifier, the type of the application identifier, and the feature identifier of the user.

With reference to the second possible implementation manner of the third aspect, in a third possible implementation manner of the third aspect, the generating unit includes a second combination subunit, a second hash subunit, a second joining subunit, and a second signing subunit, where the second combination subunit is configured to combine a second randomization factor with the feature identifier of the user to obtain a fourth string; the second hash subunit is configured to perform hashing on the fourth string according to a preset hash function to obtain a second hash value; the second joining subunit is configured to obtain a fifth string according to the type of the application identifier, the application identifier, and the second hash value; the second signing subunit is configured to perform, by using a private key, digital signing on the fifth string to obtain a sixth string; and the second combination subunit is further configured to assemble the type of the application identifier, the application identifier, and the sixth string into the application identifier certificate according to a preset sequence.

With reference to the third aspect or any one of the first to the third possible implementation manners of the third aspect, in a fourth possible implementation manner of the third aspect, the application identifier certificate application request further includes a digital signature of the user; and the apparatus further includes a verification unit; where the acquiring unit is configured to acquire a public key of the user according to the user identifier; the verification unit is configured to verify the digital signature of the user according to the public key of the user; and the generating unit is specifically configured to generate the application identifier certificate according to the application identifier and the feature identifier of the user when the digital signature of the user is successfully verified.

With reference to the fourth possible implementation manner of the third aspect, in a fifth possible implementation manner of the third aspect, the apparatus further includes an encryption unit, where the encryption unit is configured to encrypt the application identifier certificate according to the public key of the user; and the sending unit is specifically configured to send the encrypted application identifier to the user.

With reference to the third aspect or any one of the first to the fifth possible implementation manners of the third aspect, in a sixth possible implementation manner of the third aspect, the apparatus further includes a saving unit, where the receiving unit is configured to receive the user identifier sent by the user and a biometric feature; the generating unit is further configured to generate the feature identifier of the user according to a first preset algorithm and the biometric feature; the saving unit is configured to save a correspondence between the user identifier and the feature identifier of the user; and the acquiring unit is specifically configured to acquire, according to the correspondence, the feature identifier of the user corresponding to the user identifier.

With reference to the third aspect or any one of the first to the fifth possible implementation manners of the third aspect, in a seventh possible implementation manner of the third aspect, the acquiring unit includes an acquiring subunit and a generating subunit, where the acquiring subunit is configured to acquire a biometric feature of the user from the user identifier; and the generating subunit is configured to generate the feature identifier of the user according to a second preset algorithm and the biometric feature of the user.

A fourth aspect of the embodiments of the present invention discloses a terminal. The terminal includes: a receiving unit, configured to receive an application identifier certificate sent by an identifier management apparatus, where the application identifier certificate is in an encrypted state. The terminal also includes a decryption unit, configured to decrypt the application identifier certificate according to a private key of a user to acquire a first string and a digital signature of the first string from the application identifier certificate, where the first string is generated according to an application identifier and a feature identifier, and the digital signature is created by the identifier management apparatus according to the first string and a private key of the identifier management apparatus. The decryption unit is further configured to decrypt the digital signature according to a public key of the identifier management apparatus to obtain a second string. The terminal also includes the verification unit, configured to verify validity of the application identifier certificate according to the first string and the second string.

With reference to the fourth aspect, in a first possible implementation manner of the fourth aspect, the terminal further includes a determining unit and a first sending unit, where the determining unit is configured to: if the verification unit verifies that the application identifier certificate is valid, determine a target server according to an application requirement of the user; and the first sending unit is configured to send a registration request to the target server, where the registration request includes a user identifier, the application identifier certificate, and a digital signature of the application identifier certificate, so that the target server verifies the validity of the application identifier certificate and completes registration, where the digital signature of the application identifier certificate is created by the terminal according to the application identifier certificate and the private key of the user. With reference to the fourth aspect or the first possible implementation manner of the fourth aspect, in a second possible implementation manner of the fourth aspect, the terminal further includes a second sending unit, where the second sending unit is configured to: if the application identifier certificate is valid, send a communication request to another terminal, where the communication request includes the application identifier certificate and the digital signature of the application identifier certificate, so that the another terminal verifies the validity of the application identifier certificate, where the digital signature of the application identifier certificate is created by the terminal according to the application identifier certificate and the private key of the user. With reference to the first possible implementation manner of the fourth aspect or the second possible implementation manner of the fourth aspect, in a third possible implementation manner of the fourth aspect, the digital signature includes one or more of a type of the application identifier, a timestamp, or a randomizer.

With reference to the first aspect and the third aspect, it can be learned that, according to the method for managing an application identifier provided in the embodiments of the present invention, an identifier management apparatus generates an application identifier certificate according to an application identifier and a feature identifier of a user, where the application identifier certificate can prove that a corresponding application identifier is authenticated and generated for an authorized user by a trustworthy organization. The application identifier certificate maps a relationship between the application identifier and the user. The application identifier certificate can be used to verify an identity of the user, and private information of the user cannot be deduced from the application identifier, which reduces a risk of disclosing user privacy.

With reference to the second aspect and the fourth aspect, it can be learned that, according to the method for managing an application identifier provided in the embodiments of the present invention, a terminal verifies validity of an application identifier certificate according to a first string and a second string. If the application identifier certificate is valid, when the terminal communicates with a server or another terminal, the application identifier certificate can be used to prove that the application identifier is authenticated by a trustworthy organization, and the application identifier is trustworthy, which reduces a possibility of disclosing private information.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
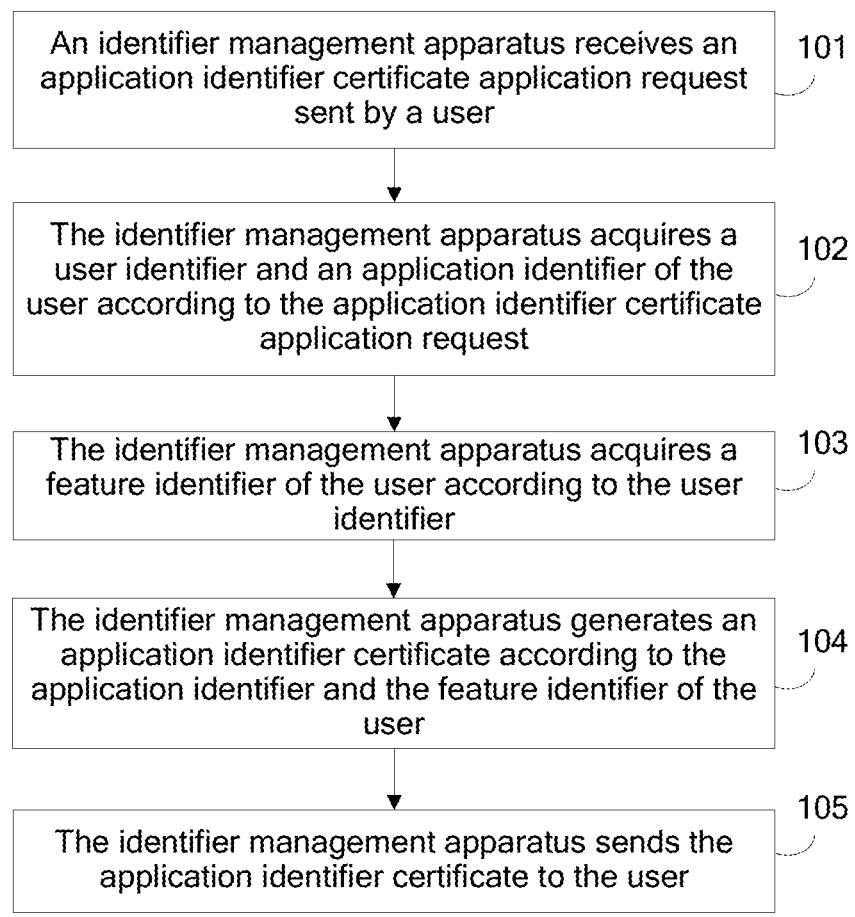
FIG. 1 is a flowchart of a method for managing an application identifier according to an embodiment of the present invention.

The following describes, according to FIG. 1, a method for managing an application identifier in an embodiment of the present invention. According to the method provided in this embodiment, an application identifier certificate can be generated according to an application identifier and a feature identifier of a user. The application identifier certificate is easy to manage and verify, which reduces a possibility of disclosing private information of the user while proving an identity of the user. The method specifically includes steps 101 to 105.

101. An identifier management apparatus receives an application identifier certificate application request sent by a user.

The identifier management apparatus is a center for generating and managing an application identifier certificate on the Internet.

102. The identifier management apparatus acquires a user identifier and an application identifier of the user according to the application identifier certificate application request.

The application identifier certificate is a certificate generated according to the application identifier. The application identifier certificate is used to prove that the application identifier is accepted by the identifier management apparatus, and can prove a relationship between the application identifier and the user.

The user identifier refers to an identifier that uniquely identifies an identity of the user. For example, the user identifier may be an identity card number of a user, or may be an identifier generated according to a physiological feature. Types of the user identifier are not listed one by one herein.

The application identifier certificate application request may include the user identifier and the application identifier, where the application identifier may be a string set by the user.

The application identifier certificate application request may include the user identifier, and then the identifier management apparatus acquires the application identifier of the user according to the user identifier. The application identifier may be pre-allocated by the identifier management apparatus to the user. For example, when the user registers with the identifier management apparatus, the identifier management apparatus allocates the application identifier to the user.

103. The identifier management apparatus acquires a feature identifier of the user according to the user identifier.

The feature identifier is obtained according to the physiological feature of the user. Common physiological features include a gene, an iris, a fingerprint, a palm print, a voiceprint, and the like.

In an embodiment of the present invention, the identifier management apparatus saves a correspondence between the user identifier and the feature identifier of the user.

In another embodiment of the present invention, the identifier management apparatus may acquire the physiological feature of the user from the user identifier, and then generate the feature identifier according to a preset algorithm and the physiological feature of the user.

104. The identifier management apparatus generates an application identifier certificate according to the application identifier and the feature identifier of the user.

In an embodiment of the present invention, because the application identifier is authenticated by an identifier management center, the application identifier may be equivalent to an identity card of the user without exposing private information of the user. Therefore, when registering with another website or application, the application identifier can still be used to represent the user. In addition, the application identifier may be associated with a bank card, a credit card, or the like.

105. The identifier management apparatus sends the application identifier certificate to the user.

In an embodiment of the present invention, the identifier management apparatus may encrypt the application identifier certificate, and then send the encrypted application identifier certificate to the user, so as to improve security in an application identifier certificate transmission process.

It can be learned from the foregoing that, according to the method for managing an application identifier provided in this embodiment of the present invention, an identifier management apparatus generates an application identifier certificate according to an application identifier and a feature identifier of a user, where the application identifier certificate can prove that a corresponding application identifier is authenticated and generated for an authorized user by a trustworthy organization. The application identifier certificate maps a relationship between the application identifier and the user. The application identifier certificate can be used to verify an identity of the user, and private information of the user cannot be deduced from the application identifier, which reduces a risk of disclosing user privacy.

In an embodiment of the present invention, the feature identifier of the user belongs to the private information of the user, and cannot be directly sent or used in an insecure environment or channel. The application identifier of the user is public information, and can be directly and publicly used. The application identifier certificate is generated according to the application identifier and the feature identifier, and can prove that a corresponding application identifier is authenticated and generated for an authorized user by a trustworthy organization. The application identifier certificate maps the relationship between the application identifier and the user. The application identifier certificate can be used to verify the identity of the user, and the private information of the user cannot be deduced from the application identifier, which reduces a risk of disclosing user privacy.

For example, genetic information of the user may be the private information, and a phone number of the user is the public information. The application identifier certificate is generated according to the genetic information of the user and the phone number of the user.

The application identifier certificate maps the relationship between the application identifier and the user. The application identifier certificate can be used to verify the identity of the user, and the private information of the user cannot be deduced from the application identifier, which reduces a risk of disclosing user privacy. Information about the user, such as iris information, fingerprint information, and palm print information, may all be the private information. An e-mail address and a license plate number of the user may both be the application identifier.

Optionally, in the foregoing method for managing an application identifier, step 104 specifically includes step 1041 to step 1045.

1041. The identifier management apparatus combines a first randomization factor with the feature identifier of the user to obtain a first string.

The first randomization factor may be a preset string, where a length of the string is not limited herein.

The first randomization factor may be inserted into a fixed position in the feature identifier of the user, so as to improve security of the feature identifier. For example, the first randomization factor may be inserted before the feature identifier, or may be inserted behind the feature identifier.

The first randomization factor may also be distributed to some fixed positions in the feature identifier of the user.

The feature identifier of the user is a string.

1042. The identifier management apparatus performs hashing on the first string according to a preset hash function to obtain a first hash value.

The preset hash function may be a common string hash function, such as BKDRHash, APHash, DJBHash, or JSHash. There are many hash functions, which are not listed one by one or limited herein.

1043. The identifier management apparatus obtains a second string according to the application identifier and the first hash value.

In an embodiment of the present invention, the identifier management apparatus may perform joining by placing the application identifier in front of the first hash value, or the identifier management apparatus may perform joining by placing the application identifier behind the first hash value. Positions of the application identifier are not listed one by one herein.

1044. The identifier management apparatus performs, by using a private key, digital signing on the second string to obtain a third string.

The private key is a private key of the identifier management apparatus.

When the user is registering with the identifier management apparatus, the user may obtain a public key of the identifier management apparatus, where the public key may be used to decrypt content that is encrypted by the identifier management apparatus by using the private key.

1045. The identifier management apparatus assembles the application identifier and the third string into the application identifier certificate according to a preset sequence.

The preset sequence may be a sequence from front to back, or may be a sequence from back to front, which is not limited herein.

Optionally, in the foregoing method for managing the application identifier, the application identifier certificate application request further includes a type of the application identifier; and step 104 specifically includes: generating, by the identifier management apparatus, the application identifier certificate according to the application identifier, the type of the application identifier, and the feature identifier of the user.

The type of the application identifier is related to an application scenario. The type of the application identifier may be classified into multiple categories, where each category may further include multiple sub-categories. For example, the application identifier may be a registered account of a social category, may be a serial number of a refrigerator of a home appliance category, may be a license plate number of a car of a machinery category, or may be a serial number of a wearable device of an electronic device category. Categories of the application identifier are not listed one by one herein.

When sending the application identifier certificate application request to the identifier management apparatus, the user may fill in the type of the application identifier, or may select a type required by the user from types of an application identifier provided in the identifier management apparatus.

The identifier management apparatus may determine a length and a format of the application identifier certificate according to the type of the application identifier.

Figure 2:
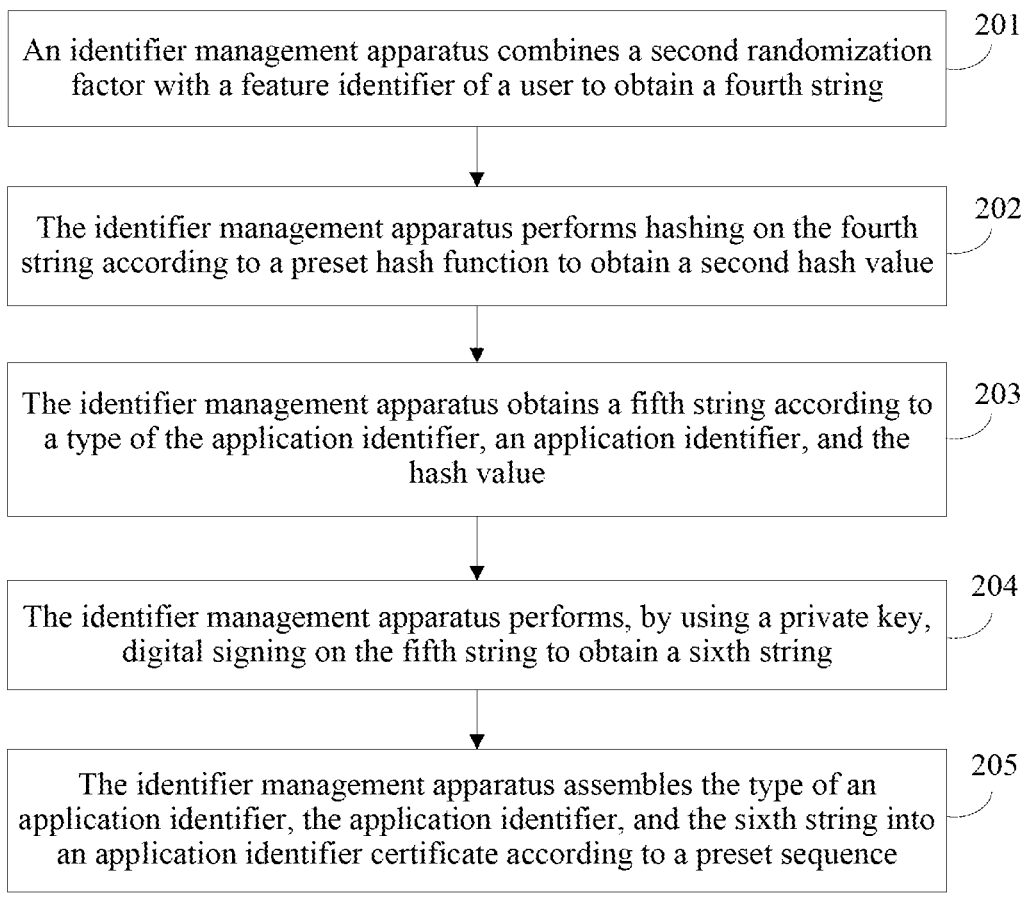
FIG. 2 is a flowchart of a method for managing an application identifier according to another embodiment of the present invention.

As shown in FIG. 2, in an embodiment of the present invention, the generating, by the identifier management apparatus, the application identifier certificate according to the application identifier, the type of the application identifier, and the feature identifier of the user specifically includes the following steps.

201. The identifier management apparatus combines a second randomization factor with the feature identifier of the user to obtain a fourth string.

The second randomization factor may be inserted into a fixed position in the feature identifier of the user, so as to improve security of the feature identifier. For example, the second randomization factor may be inserted before the feature identifier, may be inserted behind the feature identifier, or may be distributed to some fixed positions in the feature identifier of the user.

The feature identifier of the user is a string. The second randomization factor is also a preset string.

202. The identifier management apparatus performs hashing on the fourth string according to a preset hash function to obtain a second hash value.

The preset hash function may be a common string hash function, such as BKDRHash, APHash, DJBHash, or JSHash. There are many hash functions, which are not listed one by one or limited herein.

203. The identifier management apparatus obtains a fifth string according to the type of the application identifier, the application identifier, and the second hash value.

The identifier management apparatus may sequentially join the type of the application identifier, the application identifier, and the second hash value in a front-to-back sequence to obtain the fifth string, or may perform joining in a back-to-front sequence. A joining sequence is not limited herein.

204. The identifier management apparatus performs, by using a private key, digital signing on the fifth string to obtain a sixth string.

When registering with the identifier management apparatus, the user may obtain a public key of the identifier management apparatus.

205. The identifier management apparatus assembles the type of the application identifier, the application identifier, and the sixth string into the application identifier certificate according to a preset sequence.

Figure 3:
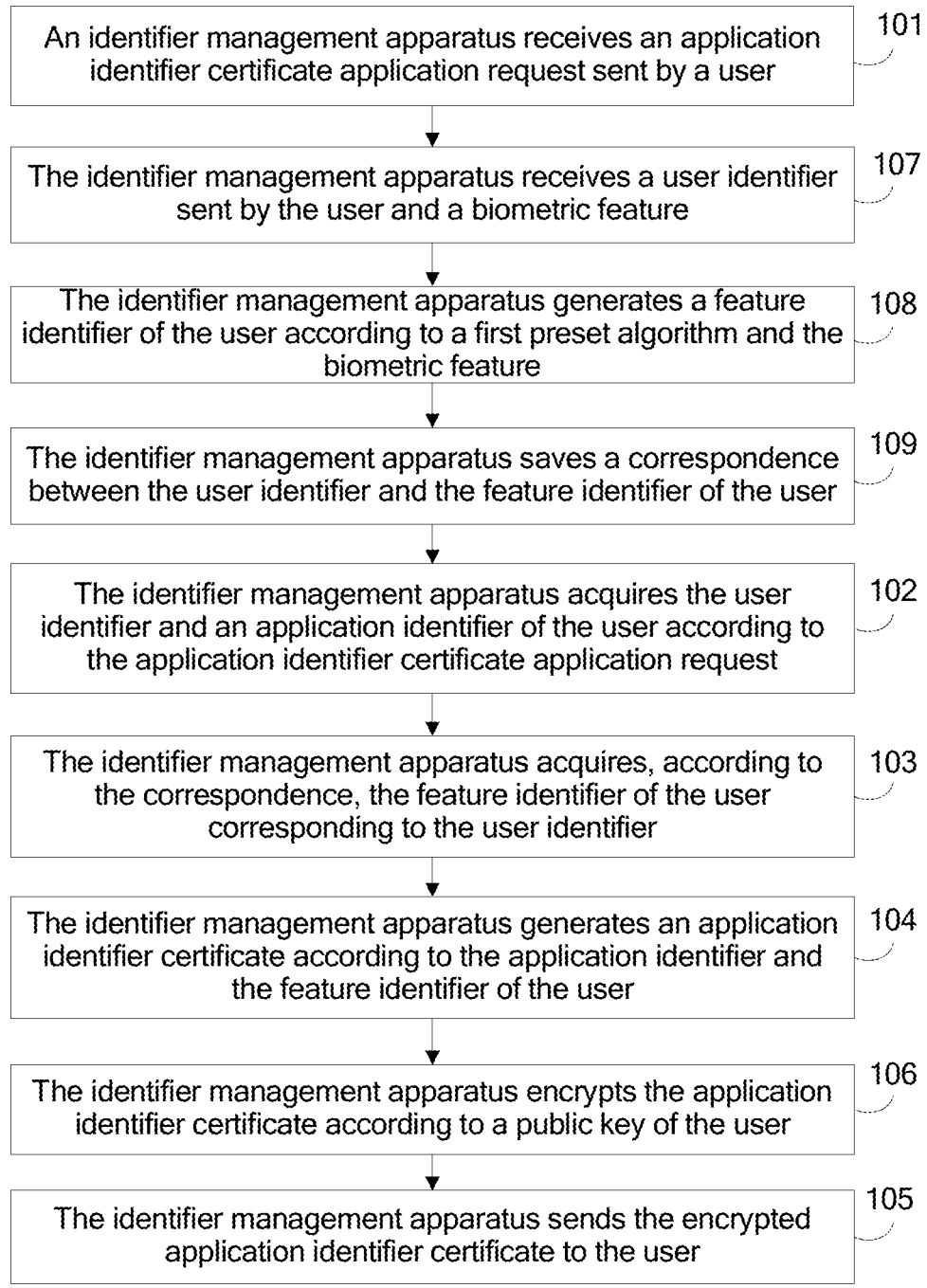
FIG. 3 is a flowchart of a method for managing an application identifier according to another embodiment of the present invention.

As shown in FIG. 3, optionally, in another embodiment of the present invention, before step 105, the method further includes the following steps.

106. The identifier management apparatus encrypts the application identifier certificate according to a public key of the user.

When registering with the identifier management apparatus, the user may save the public key of the user in the identifier management apparatus, so that the identifier management apparatus encrypts the application identifier certificate by using the public key of the user.

The sending, by the identifier management apparatus, the application identifier certificate to the user in step 105 specifically includes: sending, by the identifier management apparatus, the encrypted application identifier certificate to the user.

As shown in FIG. 3, optionally, in another embodiment of the present invention, the application identifier certificate application request further includes a digital signature of the user.

Before the generating, by the identifier management apparatus, an application identifier certificate according to the application identifier and the feature identifier of the user in step 104, the method further includes: acquiring, by the identifier management apparatus, a public key of the user according to the user identifier; and verifying, by the identifier management apparatus, the digital signature of the user according to the public key of the user.

Step 103 specifically includes: generating, by the identifier management apparatus, the application identifier certificate according to the application identifier and the feature identifier of the user when the digital signature of the user is successfully verified.

As shown in FIG. 3, optionally, in another embodiment of the present invention, before step 102, the method further includes the following steps.

107. The identifier management apparatus receives the user identifier sent by the user and a biometric feature.

The user identifier may be used to uniquely identify an identity of the user, for example, an identity card number.

108. The identifier management apparatus generates the feature identifier of the user according to a first preset algorithm and the biometric feature.

The first preset algorithm may be an encryption algorithm. Common encryption algorithms include an MD5 algorithm, an RSA algorithm, and the like.

The biometric feature may be a fingerprint, an iris, a gene, or the like. For example, if the biometric feature is a fingerprint, sampling may be performed on the fingerprint, and a sampling result is identified by using a string.

109. The identifier management apparatus saves a correspondence between the user identifier and the feature identifier of the user.

Step 103 specifically includes: acquiring, by the identifier management apparatus according to the correspondence, the feature identifier of the user corresponding to the user identifier.

Optionally, in another embodiment of the present invention, step 103 specifically includes the following steps.

1031. The identifier management apparatus acquires a biometric feature of the user from the user identifier.

The user identifier may include the biometric feature of the user, such as a fingerprint feature, a gene feature, or an iris feature. The identifier management apparatus may extract the biometric feature of the user from the user identifier, and identify the biometric feature of the user in a form of a string. There are many methods for extracting the biometric feature, which are not listed one by one herein.

1032. The identifier management apparatus generates the feature identifier of the user according to a second preset algorithm and the biometric feature of the user.

The second preset algorithm may be a common encryption algorithm, such as an MD5 algorithm or an RSA algorithm. Common encryption algorithms are not listed one by one herein.

Figure 4:
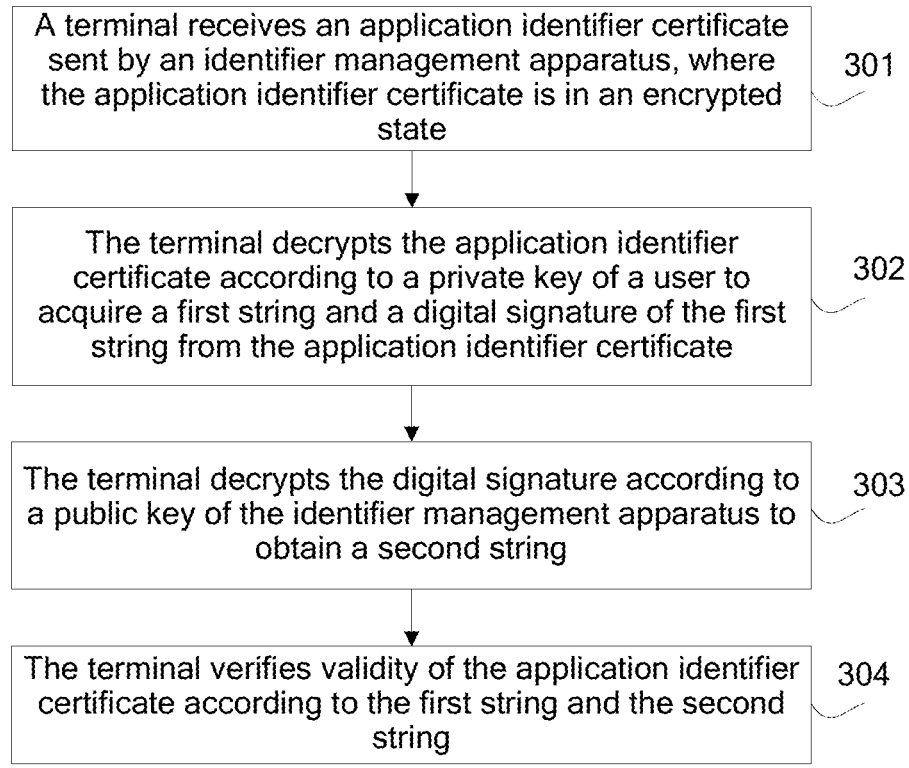
FIG. 4 is a flowchart of a method for managing an application identifier according to another embodiment of the present invention.

As shown in FIG. 4, FIG. 4 is a method for managing an application identifier provided in the present invention, where the method includes the following steps.

301. A terminal receives an application identifier certificate sent by an identifier management apparatus, where the application identifier certificate is in an encrypted state.

The identifier management apparatus encrypts the application identifier certificate by using a public key of a user, and sends the encrypted application identifier certificate to the terminal.

302. The terminal decrypts the application identifier certificate according to a private key of a user to acquire a first string and a digital signature of the first string from the application identifier certificate, where the first string is generated according to an application identifier and a feature identifier, and the digital signature is created by the identifier management apparatus according to the first string and a private key of the identifier management apparatus.

In an embodiment of the present invention, the first string may be a string generated by joining the application identifier and the feature identifier, where the feature identifier may be processed by means of hashing.

In another embodiment of the present invention, the feature identifier and a preset random code are joined to obtain a first joining string; the first joining string is processed by means of hashing to obtain a second joining string; and then the second joining string and the application identifier are joined to obtain the first string.

303. The terminal decrypts the digital signature according to a public key of the identifier management apparatus to obtain a second string.

304. The terminal verifies validity of the application identifier certificate according to the first string and the second string.

The terminal may compare whether the first string is consistent with the second string. If the first string is consistent with the second string, it is proved that the application identifier certificate is valid.

It can be learned from the foregoing that, according to the method for managing an application identifier provided in this embodiment of the present invention, a terminal verifies validity of an application identifier certificate according to a first string and a second string. If the application identifier certificate is valid, in a subsequent process of communication between the terminal and a server or another terminal, the application identifier certificate can be used to prove that an application identifier is authenticated by a trustworthy organization, and the application identifier is trustworthy, which reduces a possibility of disclosing private information.

Optionally, in another embodiment of the present invention, after step 303, the method further includes the following steps.

304. If the application identifier certificate is valid, the terminal determines a target server according to an application requirement of the user.

If the application identifier certificate is valid, the terminal may prompt the user to input information, and determine the requirement of the user according to the information input by the user.

305. The terminal sends a registration request to the target server, where the registration request includes a user identifier, the application identifier certificate, and a digital signature of the application identifier certificate, so that the target server verifies the validity of the application identifier certificate and completes registration, where the digital signature of the application identifier certificate is created by the terminal according to the application identifier certificate and the private key of the user.

The digital signature includes one or more of a timestamp, a randomizer, or a type of the application identifier. The timestamp proves a validity period of the digital signature. The randomizer is used to improve security of the digital signature. The type of the application identifier is used to indicate an application scope of the application identifier certificate.

In an embodiment of the present invention, the digital signature of the user application identifier certificate further includes an identifier and a timestamp of the target server, which can prove an object of the communication and a validity period of the communication, thereby improving security of the communication.

Optionally, in another embodiment of the present invention, after step 303, the method further includes the following steps.

306. If the application identifier certificate is valid, the terminal sends a communication request to another terminal, where the communication request includes the application identifier certificate and the digital signature of the application identifier certificate, so that the another terminal verifies the validity of the application identifier certificate, where the digital signature of the application identifier certificate is created by the terminal according to the application identifier certificate and the private key of the user.

In an embodiment of the present invention, the digital signature of the user identifier certificate further includes an identifier and a timestamp of the another terminal, which can prove a validity period and an object of the communication, thereby improving security of the communication.

Figure 5:
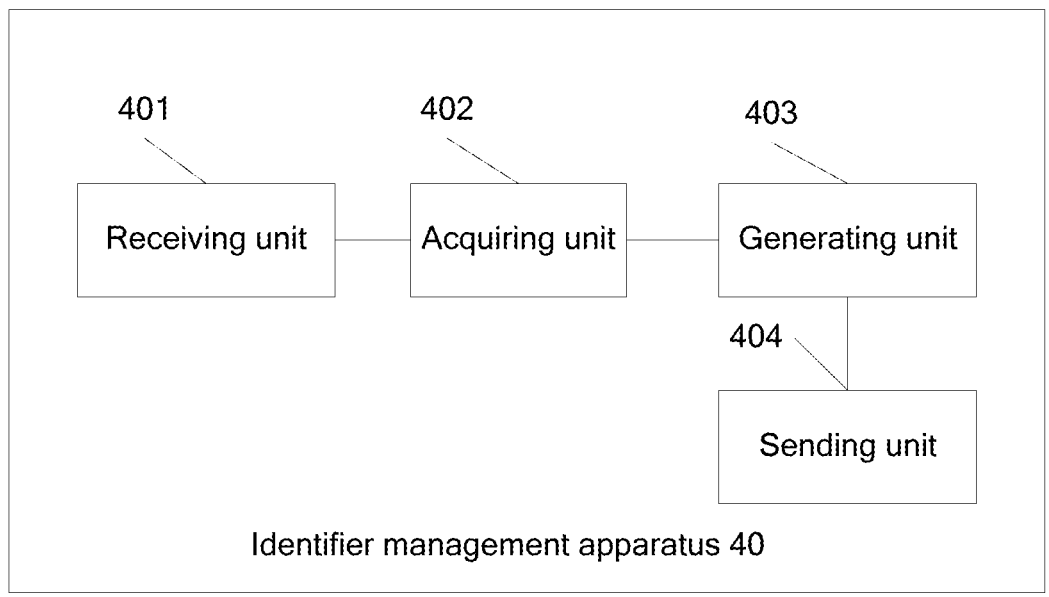
FIG. 5 is a structural diagram of an identifier management apparatus according to an embodiment of the present invention.

The following describes, according to FIG. 5, an identifier management apparatus 40 for managing an application identifier in an embodiment of the present invention. The identifier management apparatus 40 is a center for generating and managing an application identifier certificate on the Internet.

The identifier management apparatus 40 is configured to execute the method described in step 101 to step 104. The identifier management apparatus 40 includes a receiving unit 401, a generating unit 402, an acquiring unit 403, and a sending unit 404.

The receiving unit 401 is configured to receive an application identifier certificate application request sent by a user.

An identifier management apparatus is a center for generating and managing an application identifier certificate on the Internet.

The acquiring unit 402 is configured to acquire a user identifier and an application identifier of the user according to the application identifier certificate application request.

The application identifier certificate is a certificate generated according to the application identifier. The application identifier certificate is used to prove that the application identifier is accepted by the identifier management apparatus, and can prove a relationship between the application identifier and the user.

The user identifier refers to an identifier that uniquely identifies an identity of the user. For example, the user identifier may be an identity card number of a user, or may be an identifier generated according to a physiological feature. Types of the user identifier are not listed one by one herein.

The application identifier certificate application request may include the user identifier and the application identifier. The acquiring unit 402 directly acquires the user identifier and the application identifier from the application identifier certificate application request, where the application identifier may be a string set by the user.

The application identifier certificate application request may include the user identifier. The acquiring unit 402 acquires the user identifier from the application identifier certificate application request, and then acquires the application identifier of the user according to the user identifier. The application identifier may be pre-allocated by the identifier management apparatus to the user. For example, when the user registers with the identifier management apparatus, the identifier management apparatus allocates the application identifier to the user.

The acquiring unit 402 is further configured to acquire a feature identifier of the user according to the user identifier.

The feature identifier is obtained according to the physiological feature of the user. Common physiological features include a gene, an iris, a fingerprint, a palm print, a voiceprint, and the like.

In an embodiment of the present invention, the identifier management apparatus saves a correspondence between the user identifier and the feature identifier of the user.

The generating unit 403 is configured to generate an application identifier certificate according to the application identifier and the feature identifier of the user.

In an embodiment of the present invention, because the application identifier is authenticated by an identifier management center, the application identifier may be equivalent to an identity card of the user without exposing private information of the user. Therefore, when registering with another website or application, the user needs to be associated only with the application identifier. In addition, the application identifier may be associated with a bank card, a credit card, or the like.

The sending unit 404 is configured to send the application identifier certificate to the user.

The identifier management apparatus may encrypt the application identifier certificate, and then send the encrypted application identifier certificate to the user, so as to improve security in an application identifier certificate transmission process.

It can be learned from the foregoing that an application identifier certificate is generated according to an application identifier and a feature identifier of a user by using the apparatus for managing an application identifier that is provided in this embodiment of the present invention, where the application identifier certificate can prove that a corresponding application identifier is authenticated and generated for an authorized user by a trustworthy organization. The application identifier certificate maps a relationship between the application identifier and the user. The application identifier certificate can be used to verify an identity of the user, and private information of the user cannot be deduced from the application identifier, which reduces a risk of disclosing user privacy.

Optionally, based on the foregoing apparatus embodiment, in another apparatus embodiment of the present invention, the generating unit 403 includes a first combination subunit 4031, a first hash subunit 4032, a first joining subunit 4033, and a first signing subunit 4034.

The first combination subunit 4031 is configured to combine a first randomization factor with the feature identifier of the user to obtain a first string.

The first randomization factor may be a preset string, where a length of the string is not limited herein.

The first randomization factor may be inserted into a fixed position in the feature identifier of the user, so as to improve security of the feature identifier. For example, the first randomization factor may be inserted before the feature identifier, may be inserted behind the feature identifier, or may be distributed to some fixed positions in the feature identifier of the user. The feature identifier of the user is a string.

The first hash subunit 4032 is configured to perform hashing on the first string according to a preset hash function to obtain a first hash value.

The preset hash function may be a common string hash function, such as BKDRHash, APHash, DJBHash, or JSHash. There are many hash functions, which are not listed one by one or limited herein.

The first joining subunit 4033 is configured to obtain a second string according to the application identifier and the hash value.

In an embodiment of the present invention, the first joining subunit 4033 may perform joining by placing the application identifier in front of the hash value; or the first joining subunit 4033 may perform joining by placing the application identifier behind the hash value. Positions of the application identifier are not listed one by one herein.

The first signing subunit 4034 is configured to perform, by using a private key, digital signing on the second string to obtain a third string.

When the user is registering with the identifier management apparatus, the user may obtain a public key of the identifier management apparatus, where the public key may be used to decrypt content that is encrypted by the identifier management apparatus by using the private key.

The first combination subunit 4031 is further configured to assemble the application identifier and the third string into the application identifier certificate according to a preset sequence.

The preset sequence may be a front-to-back sequence, or may be a back-to-front sequence, which is not limited herein.

Optionally, based on the foregoing apparatus embodiment, in another apparatus embodiment of the present invention, the application identifier certificate application request further includes a type of the application identifier.

The generating unit 403 is further configured to generate the application identifier certificate according to the application identifier, the type of the application identifier, and the feature identifier of the user.

The type of the application identifier is related to an application scenario. The type of the application identifier may be classified into multiple categories, where each category may further include multiple sub-categories. For example, the application identifier may be a registered account of a social category, may be a serial number of a refrigerator of a home appliance category, may be a license plate number of a car of a machinery category, or may be a serial number of a wearable device of an electronic device category. Categories of the application identifier are not listed one by one herein.

When sending the application identifier certificate application request to the identifier management apparatus, the user may fill in the type of the application identifier, or may select a type required by the user from types of an application identifier provided in the identifier management apparatus.

Optionally, based on the foregoing apparatus embodiment, in another apparatus embodiment of the present invention, the generating unit 403 includes a second combination subunit 4035, a second hash subunit 4036, a second joining subunit 4037, and a second signing subunit 4038.

The second combination subunit 4035 is configured to combine a second randomization factor with the feature identifier of the user to obtain a fourth string.

The second randomization factor may be inserted into a fixed position in the feature identifier of the user, so as to improve security of the feature identifier. For example, the second randomization factor may be inserted before the feature identifier, may be inserted behind the feature identifier, or may be distributed to some fixed positions in the feature identifier of the user.

The feature identifier of the user is a string. The second randomization factor is also a preset string.

The second hash subunit 4036 is configured to perform hashing on the fourth string according to a preset hash function to obtain a second hash value.

The preset hash function may be a common string hash function, such as BKDRHash, APHash, DJBHash, or JSHash. There are many hash functions, which are not listed one by one or limited herein.

The second joining subunit 4037 is configured to obtain a fifth string according to the type of the application identifier, the application identifier, and the second hash value.

The identifier management apparatus may sequentially join the type of the application identifier, the application identifier, and the hash value in a front-to-back sequence to obtain the fifth string, or may perform joining in a back-to-front sequence. A joining sequence is not limited herein.

The second signing subunit 4038 is configured to perform, by using a private key, digital signing on the fifth string to obtain a sixth string.

When registering with the identifier management apparatus, the user may obtain a public key of the identifier management apparatus.

The second combination subunit 4035 is further configured to assemble the type of the application identifier, the application identifier, and the sixth string into the application identifier certificate according to a preset sequence.

Figure 6:
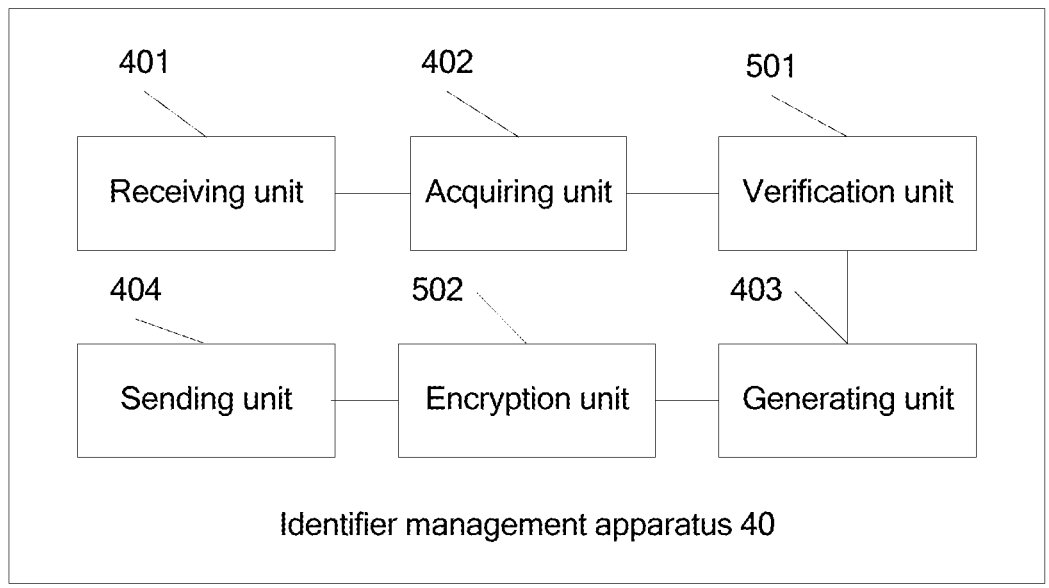
FIG. 6 is a structural diagram of an identifier management apparatus according to another embodiment of the present invention.

As shown in FIG. 6, optionally, based on the foregoing apparatus embodiments, in another apparatus embodiment of the present invention, the application identifier certificate application request further includes a digital signature of the user; and the apparatus further includes a verification unit 501.

The acquiring unit 402 is configured to acquire a public key of the user according to the user identifier.

The verification unit 501 is configured to verify the digital signature of the user according to the public key of the user.

The generating unit 403 is specifically configured to generate the application identifier certificate according to the application identifier and the feature identifier of the user when the digital signature of the user is successfully verified.

Optionally, based on the foregoing apparatus embodiment, in another apparatus embodiment of the present invention, the apparatus further includes an encryption unit 502.

The encryption unit 502 is configured to encrypt the application identifier certificate according to the public key of the user.

The sending unit 404 is specifically configured to send the encrypted application identifier certificate to the user.

Optionally, based on the foregoing apparatus embodiments, in another apparatus embodiment of the present invention, the apparatus further includes a saving unit 503.

The receiving unit 401 is configured to receive the user identifier sent by the user and a biometric feature.

The generating unit 403 is further configured to generate the feature identifier of the user according to a first preset algorithm and the biometric feature.

The first preset algorithm may be an encryption algorithm. Common encryption algorithms include an MD5 algorithm, an RSA algorithm, and the like.

The saving unit 503 is configured to save a correspondence between the user identifier and the feature identifier of the user.

The acquiring unit 402 is specifically configured to acquire, according to the correspondence, the feature identifier of the user corresponding to the user identifier.

Optionally, based on the foregoing apparatus embodiments, in another apparatus embodiment of the present invention, the acquiring unit 402 includes an acquiring subunit 4021 and a generating subunit 4022, where the acquiring subunit 4021 is configured to acquire a biometric feature of the user from the user identifier; and the generating subunit 4022 is configured to generate the feature identifier of the user according to a second preset algorithm and the biometric feature of the user.

The second preset algorithm may be a common encryption algorithm, such as an MD5 algorithm or an RSA algorithm. Common encryption algorithms are not listed one by one herein.

Figure 7:
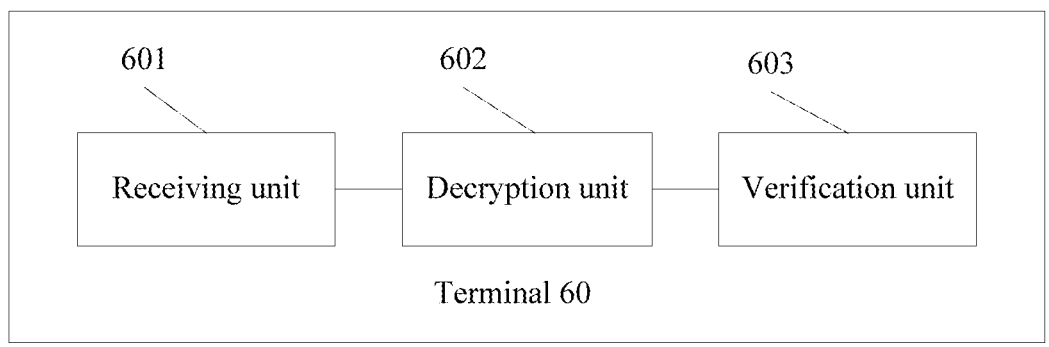
FIG. 7 is a structural diagram of a terminal according to an embodiment of the present invention.

The following describes, according to FIG. 7, a terminal 60 in an embodiment of the present invention. The terminal 60 is configured to execute the method described in step 301 to step 304. The terminal 60 includes a receiving unit 601, a decryption unit 602, and a verification unit 603.

The receiving unit 601 is configured to receive an application identifier certificate sent by an identifier management apparatus, where the application identifier certificate is in an encrypted state.

The identifier management apparatus encrypts the application identifier certificate by using a public key of the user, and sends the encrypted application identifier certificate to the terminal.

The decryption unit 602 is configured to decrypt the application identifier certificate according to a private key of the user to acquire a first string and a digital signature of the first string from the application identifier certificate, where the first string is generated according to an application identifier and a feature identifier, and the digital signature is created by the identifier management apparatus according to the first string and a private key of the identifier management apparatus.

In an embodiment of the present invention, the first string may be a string generated by joining the application identifier and the feature identifier, where the feature identifier may be processed by means of hashing.

In another embodiment of the present invention, the feature identifier and a preset random code are joined to obtain a first joining string; the first joining string is processed by means of hashing to obtain a second joining string; and then the second joining string and the application identifier are joined to obtain the first string.

The decryption unit 602 is further configured to decrypt the digital signature according to a public key of the identifier management apparatus to obtain a second string.

The verification unit 603 is configured to verify validity of the application identifier certificate according to the first string and the second string.

The verification unit 603 compares content included in the second string with content included in the first string, so as to determine whether the application identifier certificate is tampered. If the application identifier certificate is not tampered, it proves that the application identifier certificate is valid.

It can be learned from the foregoing that, according to the terminal provided in this embodiment of the present invention, the terminal verifies validity of an application identifier certificate according to a first string and a second string. If the application identifier certificate is valid, in a subsequent process of communication between the terminal and a server or another terminal, the application identifier certificate can be used to prove that an application identifier is authenticated by a trustworthy organization, and the application identifier is trustworthy, which reduces a possibility of disclosing private information.

Optionally, based on the foregoing terminal embodiment, in another terminal embodiment of the present invention, the terminal 60 further includes a determining unit 604 and a first sending unit 605.

The determining unit 604 is configured to: if the verification unit verifies that the application identifier certificate is valid, determine a target server according to a requirement of the user.

The terminal may receive information entered by the user and determine the requirement of the user according to the information entered by the user.

The first sending unit 605 is configured to send a registration request to the target server, where the registration request includes a user identifier, the application identifier certificate, and a digital signature of the application identifier certificate so that the target server verifies the validity of the application identifier certificate and completes registration, where the digital signature of the application identifier certificate is created by the terminal according to the application identifier certificate and the private key of the user.

In an embodiment of the present invention, the digital signature of the application identifier certificate further includes an identifier and a timestamp of the target server, which can prove a time and an object of the communication, thereby improving security of the communication.

Optionally, based on the foregoing terminal embodiment, in another terminal embodiment of the present invention, the terminal 60 further includes a second sending unit 606, where the second sending unit 606 is configured to: if the application identifier certificate is valid, send a communication request to another terminal, where the communication request includes the application identifier certificate and the digital signature of the application identifier certificate, so that the another terminal verifies the validity of the application identifier certificate, where the digital signature of the application identifier certificate is created by the terminal according to the application identifier certificate and the private key of the user.

In an embodiment of the present invention, the digital signature of the user identifier certificate further includes an identifier and a timestamp of the another terminal, which can prove an object of the communication and a validity period of the communication, thereby improving security of the communication.

Optionally, based on the foregoing terminal embodiment, in another terminal embodiment of the present invention, the digital signature includes one or more of a timestamp, a randomizer, or a type of the application identifier. The timestamp proves a validity period of the digital signature. The randomizer is used to improve security of the digital signature. The type of the application identifier is used to indicate an application scope of the application identifier certificate.

FIG. 7 describes a structure of an identifier management apparatus according to another embodiment of the present invention, including at least one processor 701 (for example, a CPU), a memory 702, at least one network interface 703, at least one communications bus 704, and at least one receiver 705, where the at least one communications bus 704 is configured to implement connection and communication between these apparatuses. The processor 701 is configured to execute an executable module stored in the memory 702, for example, a computer program. The memory 702 may include a high-speed random access memory (RAM: Random Access Memory), and may further include a non-volatile memory (non-volatile memory), for example, at least one eMMC (Embedded Multimedia Card, embedded multimedia card) memory. The at least one network interface 703 (which may be wired or wireless) implements communicative connection between a network device and at least one other network element over the Internet, a wide area network, a local area network, a metropolitan area network, or the like.

In some implementation manners, a program 7021 is stored in the memory 702, where the program 7021 may be executed by the processor 701, and this program includes: receiving an application identifier certificate application request sent by a user; acquiring a user identifier and an application identifier of the user according to the application identifier certificate application request; acquiring a feature identifier of the user according to the user identifier; generating an application identifier certificate according to the application identifier and the feature identifier of the user; and sending the application identifier certificate to the user.

Optionally, based on the foregoing program, the generating an application identifier certificate according to the application identifier and the feature identifier of the user specifically includes: combining a first randomization factor with the feature identifier of the user to obtain a first string; performing hashing on the first string according to a preset hash function to obtain a first hash value; obtaining a second string according to the application identifier and the first hash value; performing, by using a private key, digital signing on the second string to obtain a third string; and assembling the application identifier and the third string into the application identifier certificate according to a preset sequence.

Optionally, based on the foregoing program, the application identifier certificate application request further includes a type of the application identifier; and the generating an application identifier certificate according to the application identifier and the feature identifier of the user specifically includes: generating the application identifier certificate according to the application identifier, the type of the application identifier, and the feature identifier of the user.

Optionally, based on the foregoing program, the generating the application identifier certificate according to the application identifier, the type of the application identifier, and the feature identifier of the user specifically includes: combining a second randomization factor with the feature identifier of the user to obtain a fourth string; performing hashing on the fourth string according to a preset hash function to obtain a second hash value; obtaining a fifth string according to the type of the application identifier, the application identifier, and the second hash value; performing, by using a private key, digital signing on the fifth string to obtain a sixth string; and assembling the type of the application identifier, the application identifier, and the sixth string into the application identifier certificate according to a preset sequence.

Optionally, based on the foregoing program, the application identifier certificate application request further includes a digital signature of the user; and before the generating an application identifier certificate according to the application identifier and the feature identifier of the user, the method further includes: acquiring a public key of the user according to the user identifier; verifying the digital signature of the user according to the public key of the user; and generating the application identifier certificate according to the application identifier and the feature identifier of the user when the digital signature of the user is successfully verified.

Optionally, based on the foregoing program, before the sending, by the identifier management apparatus, the application identifier certificate to the user, the method further includes: encrypting, by the identifier management apparatus, the application identifier certificate according to the public key of the user; and the sending the application identifier to the user specifically includes: sending the encrypted application identifier to the user.

Optionally, based on the foregoing program, before the acquiring a feature identifier of the user according to the user identifier, the method further includes: receiving a user identifier sent by the user and a biometric feature; generating the feature identifier of the user according to a first preset algorithm and the biometric feature; and saving a correspondence between the user identifier and the feature identifier of the user; and the acquiring a feature identifier of the user according to the user identifier specifically includes: acquiring, according to the correspondence, the feature identifier of the user corresponding to the user identifier.

Optionally, based on the foregoing program, the acquiring a feature identifier of the user according to the user identifier specifically includes: acquiring a biometric feature of the user from the user identifier; and generating the feature identifier of the user according to a second preset algorithm and the biometric feature of the user.

Specific implementation steps are the same as the embodiment shown in FIG. 1, and details are not described herein again.

It can be learned from the foregoing that, according to the method for managing an application identifier provided in this embodiment of the present invention, an identifier management apparatus generates an application identifier certificate according to an application identifier and a feature identifier of a user, where the application identifier certificate can prove that a corresponding application identifier is authenticated and generated for an authorized user by a trustworthy organization. The application identifier certificate maps a relationship between the application identifier and the user. The application identifier certificate can be used to verify an identity of the user, and private information of the user cannot be deduced from the application identifier, which reduces a risk of disclosing user privacy.

Figure 8:
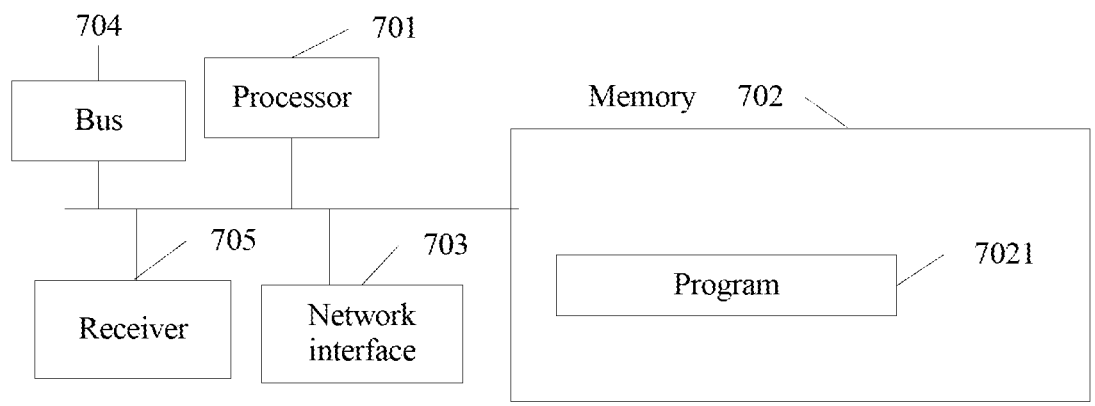
FIG. 8 is a structural diagram of an identifier management apparatus according to another embodiment of the present invention.
Figure 9:
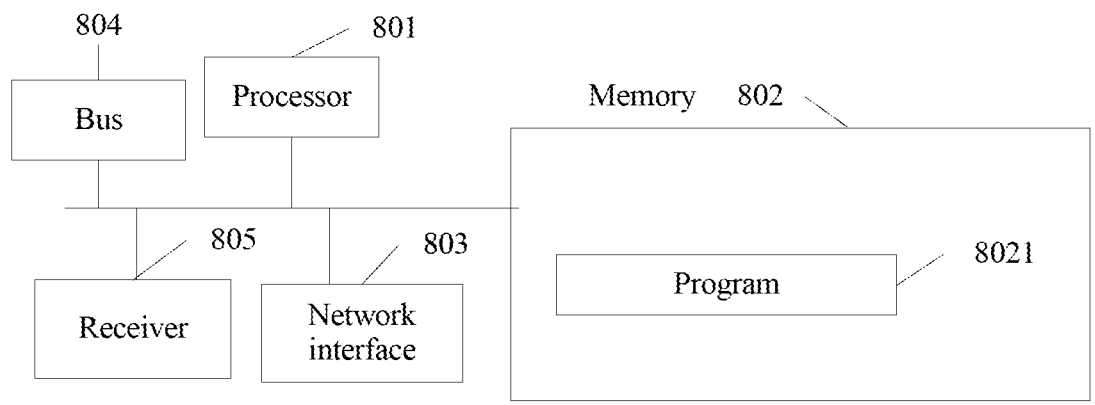
FIG. 9 is a structural diagram of a terminal according to another embodiment of the present invention.

FIG. 8 describes a structure of a terminal according to another embodiment of the present invention, including at least one processor 801 (for example, a CPU), a memory 802, at least one network interface 803, at least one communications bus 804, and at least one receiver 805, which are configured to implement connection and communication between these apparatuses. The processor 801 is configured to execute an executable module stored in the memory 802, for example, a computer program. The memory 802 may include a high-speed random access memory (RAM: Random Access Memory), and may further include a non-volatile memory, for example, at least one eMMC (Embedded Multi Media Card) memory. The at least one network interface 803 (which may be wired or wireless) implements communicative connection between the network device and at least one other network element over the Internet, a wide area network, a local area network, a metropolitan area network, or the like.

In some implementation manners, a program 8021 is stored in the memory 802, where the program 8021 may be executed by the processor 801, and this program includes: receiving an application identifier certificate sent by an identifier management apparatus, where the application identifier certificate is in an encrypted state; decrypting the application identifier certificate according to a private key of a user to acquire a first string and a digital signature of the first string from the application identifier certificate, where the first string is generated according to an application identifier and a feature identifier, and the digital signature is created by the identifier management apparatus according to the first string and a private key of the identifier management apparatus; decrypting the digital signature according to a public key of the identifier management apparatus to obtain a second string; and verifying validity of the application identifier certificate according to the first string and the second string.

Optionally, based on the foregoing program, after the verifying validity of the application identifier certificate according to the first string and the second string, the method further includes: if the application identifier certificate is valid, determining, by the terminal, a target server according to an application requirement of the user; and sending, by the terminal, a registration request to the target server, where the registration request includes a user identifier, the application identifier certificate, and a digital signature of the application identifier certificate, so that the target server verifies the validity of the application identifier certificate and completes registration, where the digital signature of the application identifier certificate is created by the terminal according to the application identifier certificate and the private key of the user. Optionally, based on the foregoing program, after the verifying, by the terminal, validity of the application identifier certificate according to the first string and the second string, the method further includes: if the application identifier certificate is valid, sending, by the terminal, a communication request to another terminal, where the communication request includes the application identifier certificate and the digital signature of the application identifier certificate, so that the another terminal verifies the validity of the application identifier certificate, where the digital signature of the application identifier certificate is created by the terminal according to the application identifier certificate and the private key of the user.

Optionally, based on the foregoing program, the digital signature includes one or more of a type of the application identifier, a timestamp, or a randomizer.

It can be learned from the foregoing that, the terminal provided in this embodiment of the present invention verifies validity of an application identifier certificate is verified according to a first string and a second string. If the application identifier certificate is valid, in a subsequent process of communication between the terminal and a server or another terminal, the application identifier certificate can be used to prove that an application identifier is authenticated by a trustworthy organization, and the application identifier is trustworthy, which reduces a possibility of disclosing private information.

It should be noted that, for brief description, the foregoing method embodiments are represented as a series of actions. However, a person skilled in the art should appreciate that the present invention is not limited to the described sequence of the actions, because according to the present invention, some steps may be performed in other sequences or simultaneously. In addition, a person skilled in the art should also understand that the embodiments described in this specification all belong to exemplary embodiments, and the involved actions and modules are not necessarily mandatory to the present invention.

Content such as information exchange and an execution process between the modules in the apparatus and the system is based on a same idea as the method embodiments of the present invention. Therefore, for detailed content, refer to descriptions in the method embodiments of the present invention, and details are not described herein again.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

Specific examples are used in this specification to describe the principle and implementation manners of the present invention. The descriptions of the foregoing embodiments are merely intended to help understand the method and idea of the present invention. In addition, with respect to the implementation manners and the application scope, modifications may be made by a person of ordinary skill in the art according to the idea of the present invention. Therefore, this specification shall not be construed as a limitation on the present invention.

What is claimed is:

1. A method, comprising:
   receiving, by an apparatus, an application access certificate request sent by a user, wherein the application certificate access request comprises: a user identifier, an application identifier of the user, and a type of the application identifier;
   extracting, by the apparatus, the user identifier and the application identifier of the user from the application access certificate request;
   acquiring, by the apparatus, a biometric feature identifier of the user according to the user identifier;
   generating, by the apparatus, an application access certificate according to the application identifier, the type of the application identifier, and the biometric feature identifier of the user, wherein generating the application access certificate according to the application identifier, the type of the application identifier, and the biometric feature identifier of the user comprises:
      combining, by the apparatus, a second randomization factor with the biometric feature identifier of the user to obtain a fourth string;
      performing, by the apparatus, hashing on the fourth string according to a preset hash function to obtain a second hash value;
      obtaining, by the apparatus, a fifth string according to the type of the application identifier, the application identifier, and the second hash value;
      performing, by the apparatus using a private key, digital signing on the fifth string to obtain a sixth string; and
      assembling, by the apparatus, the type of the application identifier, the application identifier, and the sixth string into the application access certificate according to a preset sequence; and
   sending, by the apparatus, the application access certificate to the user.

2. The method according to claim 1, wherein generating the application access certificate according to the application identifier, the type of the application identifier, and the biometric feature identifier of the user further comprises:
   combining, by the apparatus, a first randomization factor with the biometric feature identifier of the user to obtain a first string;
   performing, by the apparatus, hashing on the first string according to the preset hash function to obtain a first hash value;
   obtaining, by the apparatus, a second string according to the application identifier and the first hash value;
   performing, by the apparatus using the private key, digital signing on the second string to obtain a third string; and
   assembling, by the apparatus, the application identifier and the third string into the application access certificate according to the preset sequence.

3. The method according to claim 1, wherein the application access certificate request further comprises a digital signature of the user; and
   wherein before generating the application access certificate according to the application identifier, the type of the application identifier, and the biometric feature identifier of the user, the method further comprises:
      acquiring, by the apparatus, a public key of the user according to the user identifier;
      verifying, by the apparatus, the digital signature of the user according to the public key of the user; and
      generating, by the apparatus, the application access certificate according to the application identifier, the type of the application identifier, and the biometric feature identifier of the user when the digital signature of the user is successfully verified.

4. The method according to claim 3, wherein before sending the application access certificate to the user, the method further comprises:
   encrypting, by the apparatus, the application access certificate according to the public key of the user; and
   wherein sending, by the apparatus, the application access certificate to the user comprises:
      sending, by the apparatus, the encrypted application access certificate to the user.

5. The method according to claim 1, wherein before acquiring the biometric feature identifier of the user according to the user identifier, the method further comprises:
   receiving, by the apparatus, the user identifier sent by the user and a biometric feature;
   generating, by the apparatus, the biometric feature identifier of the user according to a first preset algorithm and the biometric feature; and
   saving, by the apparatus, a correspondence between the user identifier and the biometric feature identifier of the user; and
   wherein acquiring the biometric feature identifier of the user according to the user identifier comprises:
      acquiring, by the apparatus according to the correspondence, the biometric feature identifier of the user corresponding to the user identifier.

6. The method according to claim 1, wherein acquiring the biometric feature identifier of the user according to the user identifier comprises:
   acquiring, by the apparatus, a biometric feature of the user from the user identifier; and
   generating, by the apparatus, the biometric feature identifier of the user according to a second preset algorithm and the biometric feature of the user.

7. A method, comprising:
   receiving, by a terminal, an application access certificate sent by an apparatus, wherein the application access certificate is in an encrypted state;
   decrypting, by the terminal, the application access certificate according to a private key of a user to acquire a first string and a digital signature of the first string from the application access certificate, wherein the first string is generated according to an application identifier and a biometric feature identifier of the user, and the digital signature of the first string is created by the apparatus according to the first string and a private key of the apparatus;

decrypting, by the terminal, the digital signature of the first string according to a public key of the apparatus to obtain a second string;

verifying, by the terminal, validity of the application access certificate according to the first string and the second string;

after it is verified that the application access certificate is valid, determining, by the terminal, a target server according to an application requirement of the user; and sending, by the terminal, a registration request to the target server, wherein the registration request comprises a user identifier, the application access certificate, and a digital signature of the application access certificate, and wherein sending the registration request to the target server causes the target server to verify the validity of the application access certificate and to complete a registration process for the terminal, wherein the digital signature of the application access certificate is created by the terminal according to the application access certificate and the private key of the user.

8. The method according to claim 7, wherein the digital signature of the application access certificate comprises one or more of a type of the application identifier, a timestamp, or a randomizer.

9. The method according to claim 7, wherein after verifying the validity of the application access certificate according to the first string and the second string, the method further comprises:

sending, by the terminal, a communication request to another terminal, after it is verified that the application access certificate is valid, wherein the communication request comprises the application access certificate and the digital signature of the application access certificate, and wherein sending the communication request to the another terminal causes the another terminal to verify the validity of the application access certificate, wherein the digital signature of the application access certificate is created by the terminal according to the application access certificate and the private key of the user.

10. An apparatus, comprising:

a receiver, configured to receive an application access certificate request sent by a user, wherein the application certificate access request comprises: a user identifier, an application identifier of the user, and a type of the application identifier;

a processor; and a non-transitory computer-readable storage medium storing a program to be executed by the processor, the program including instructions for:

extracting the user identifier and the application identifier of the user from the application access certificate request;

acquiring a biometric feature identifier of the user according to the user identifier; and generating an application access certificate according to the application identifier, the type of the application identifier, and the biometric feature identifier of the user, wherein generating the application access certificate according to the application identifier, the type of the application identifier, and the biometric feature identifier of the user comprises:

combining a second randomization factor with the biometric feature identifier of the user to obtain a fourth string;

performing hashing on the fourth string according to a preset hash function to obtain a second hash value;

obtaining a fifth string according to the type of the application identifier, the application identifier, and the second hash value;

performing, using a private key, digital signing on the fifth string to obtain a sixth string; and assembling the type of the application identifier, the application identifier, and the sixth string into the application access certificate according to a preset sequence; and a transmitter, configured to send the application access certificate to the user.

11. The apparatus according to claim 10, wherein generating the application access certificate according to the application identifier, the type of the application identifier, and the biometric feature identifier of the user further comprises:

combining a first randomization factor with the biometric feature identifier of the user to obtain a first string;

performing hashing on the first string according to the preset hash function to obtain a first hash value;

obtaining a second string according to the application identifier and the first hash value;

performing, using the private key, digital signing on the second string to obtain a third string; and assembling the application identifier and the third string into the application access certificate according to the preset sequence.

12. The apparatus according to claim 10, wherein the application access certificate request further comprises a digital signature of the user; and wherein the program further includes instructions for:

acquiring a public key of the user according to the user identifier;

verifying the digital signature of the user according to the public key of the user; and generating the application access certificate according to the application identifier, the type of the application identifier, and the biometric feature identifier of the user when the digital signature of the user is successfully verified.

13. The apparatus according to claim 12, wherein the program further includes instructions for encrypting the application access certificate according to the public key of the user; and wherein the transmitter is configured to send the encrypted application access certificate to the user.

14. The apparatus according to claim 10, wherein the receiver is configured to receive the user identifier sent by the user and a biometric feature; and wherein the program further includes instructions for:

generating the biometric feature identifier of the user according to a first preset algorithm and the biometric feature;

saving a correspondence between the user identifier and the biometric feature identifier of the user; and acquiring, according to the correspondence, the biometric feature identifier of the user corresponding to the user identifier.

15. The apparatus according to claim 10, wherein acquiring the biometric feature identifier of the user according to the user identifier comprises:

acquiring a biometric feature of the user from the user identifier; and generating the biometric feature identifier of the user according to a second preset algorithm and the biometric feature of the user.

16. A terminal, comprising:
a receiver, configured to receive an application access certificate sent by apparatus, wherein the application access certificate is in an encrypted state;
a processor;
a non-transitory computer-readable storage medium storing a program to be executed by the processor, the program including instructions for:
  decrypting the application access certificate according to a private key of a user to acquire a first string and a digital signature of the first string from the application access certificate, wherein the first string is generated according to an application identifier and a biometric feature identifier of the user, and the digital signature of the first string is created by the apparatus according to the first string and a private key of the apparatus;
  decrypting the digital signature of the first string according to a public key of the apparatus to obtain a second string;
  verifying validity of the application access certificate according to the first string and the second string; and
  after it is verified that the application access certificate is valid, determining a target server according to an application requirement of the user; and
  a transmitter, configured to send a registration request to the target server, wherein the registration request comprises a user identifier, the application access certificate, and a digital signature of the application access certificate, and wherein sending the registration request to the target server causes the target server to verify the validity of the application access certificate and to complete a registration process for the terminal, wherein the digital signature of the application access certificate is created by the terminal according to the application access certificate and the private key of the user.

17. The terminal according to claim 16, wherein the digital signature of the application access certificate comprises one or more of a type of the application identifier, a timestamp, or a randomizer.

18. The terminal according to claim 16, wherein the terminal further comprises a transmitter, configured to:
send a communication request to another terminal when the application access certificate is valid, wherein the communication request comprises the application access certificate and the digital signature of the application access certificate, and wherein sending the communication request to the another terminal causes the another terminal to verify the validity of the application access certificate, wherein the digital signature of the application access certificate is created by the terminal according to the application access certificate and the private key of the user.

* * * * *